Figure 1:
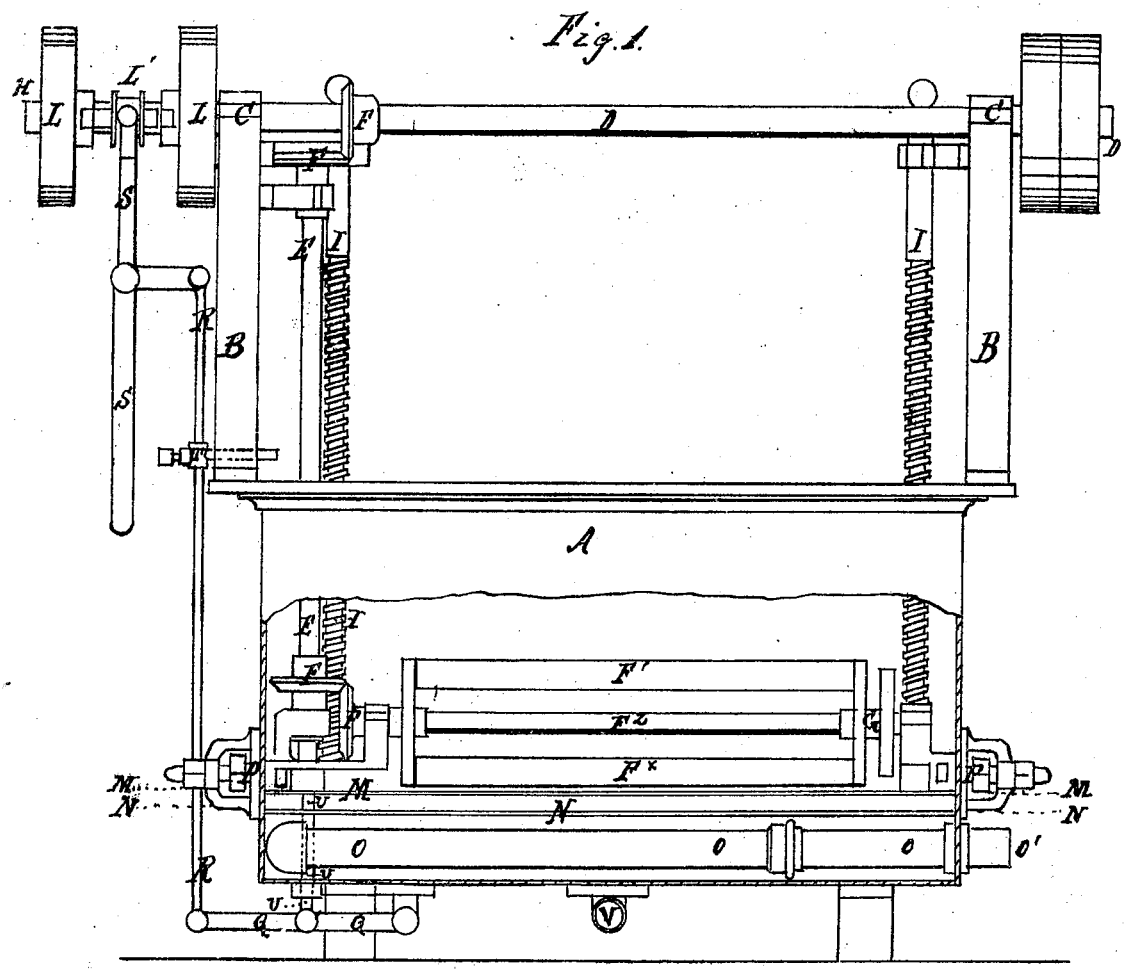

J & M. Stark.
Mashing and Boiling Wort for Beer.
Nº 73056     Patented Jan. 7, 1868.

Witnesses.
Austin S. Hart.
H. W. Dopp.

Inventors.
John Stark.
Michael Stark.

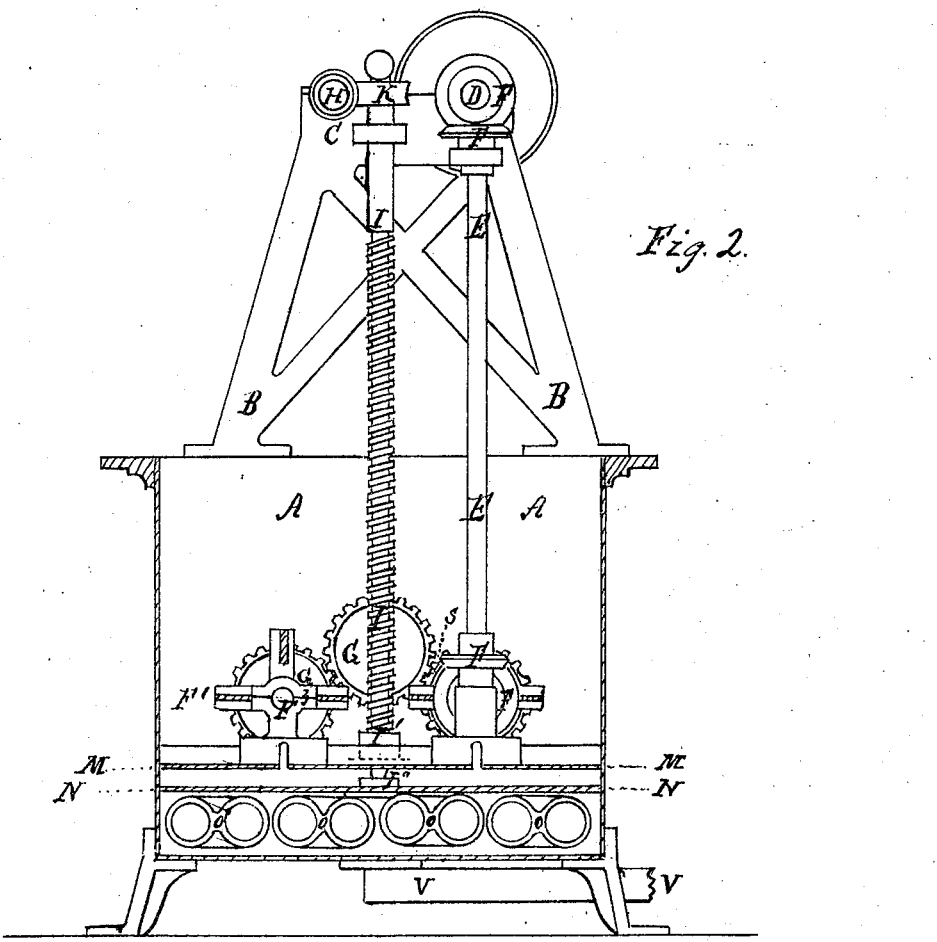

United States Patent Office.

JOHN STARK AND MICHAEL STARK, OF BUFFALO, NEW YORK.

Letters Patent No. 73,056, dated January 7, 1868.

IMPROVED MACHINE FOR MASHING AND BOILING WORT FOR BEER.

*The Schedule referred to in these Letters Patent and making part of the same.*

TO ALL WHOM IT MAY CONCERN:

Be it known that we, JOHN STARK and MICHAEL STARK, both of Buffalo, in the county of Erie, and the State of New York, have invented a new and useful "Machine for Mashing and Boiling the Materials of which Beer is made, in one and the same boiler;" and we do hereby declare that the following is a full, clear, and exact description of the same, reference being had to the annexed drawings making a part of this specification, in which—

Figure I is a side view, representing the machine in its various parts, the boiler A having a side cut out, so as to allow the mashing-machine to be shown in its proper place when in operation.

Figure II is a partial cut of Fig. I.

A is the beer-boiler, which might be made either of metal or wood. B B are two frame-pieces. The same are secured to each end of the boiler A; they are for the purpose of supporting the mashing-machine. C C are journals on B B for shaft D. D is the driving-shaft, by means of which motion is communicated to shaft E. It is provided with a loose and a tight pulley on one end, and a conical gear-wheel on nearly the other end. E is an upright shaft, with two conical gearing-wheels, of which one is fastened to the upper end of the shaft by means of a key, and the other is loose, so as to slide up or down on it. The shaft and wheel are provided for this purpose with a key and key-seat. F F F F are conical gearing-wheels, by means of which motion is transmitted to the rotating mash-bucket shaft $F^2$. $F^1$ are the mash-buckets. $F^2$ and $F^3$ are the mash-buckets' shafts. G G G are spur-wheels, by means of which the bucket-shaft $F^3$ receives its motion. H is the driving-shaft, for raising or lowering the mashing-apparatus by means of screws I I. The same are provided with two loose pulleys, L L, one of which receives a cross, and the other a straight belt. The pulleys are to be fastened on shaft by means of clutches L'. The object of this is to enable the operator to make the shaft rotate either to the right or left, or to stop it. The shaft is also provided with two screw-worms, which lie in two screw-wheels, K. They are secured to the top ends of screws I I. I I are two spindle-screws. The same have their bearings with their lower end at the bottom of boiler A, and with their upper end on frame B B. They are provided with a screw-wheel, K, on the upper end, and also with a nut, I', which nut I' is secured to the bucket's frame, M. These nuts I' I' receive motion from shaft H. The whole arrangement described in letters H and I is for the purpose of raising and lowering the mashing-machine—of raising for the purpose of cleaning, and of lowering for the purpose of practical use when in its proper place. M is the frame or base-plate, to which are secured the pillar-blocks for the two bucket-shafts $F^2$ $F^3$, gearing-wheels G G G, and nuts I'. Said base-plate is constructed of perforated sheet metal, for the purpose of serving as a strainer, and has to be fitted snugly to the sides of the boiler A, so as not to allow the screenings to work themselves through or pass by. In fact, it has to constitute, in connection with boiler A, a perfect mash-tub during the time mashing is going on. N is a second strainer-bottom, below M. It is resting on steam-pipes O, and is movable only for the purpose of cleaning. O is a series of copper pipes, secured to the bottom of boiler A, for the purpose of passing steam through them, in order to raise the mashing-products to any desired temperature during the time mashing is going on. When this is done, and the screenings, with the mashing-machine, are raised out of boiler A, the remaining liquid is to be boiled by means of a continued application of steam through said pipes. The boiling is effected by eradiation of these copper pipes. P are four bolt-screws, by means of which the mashing-machine is kept in its proper place during the time it is in operation. G, R, S, T, U is a shifting-arrangement, by means of which the clutches L' are moved out of either of the pulleys L. This is effected when the screws I I are set in motion, and therewith lowering or raising the machine. Frame M then coming in conflict with stoppers T or U, as it might be, will at once move lever S, and so stop connection between L and L'. These stoppers are so regulated that the machine will always stop at the proper place. V is a pipe, by means of which the beer, when ready, is to be withdrawn from the boiler A.

To operate this machine, the same is first to be put into the position as shown in Fig. I. The mashing-ingredients are to be put into the boiler A. Steam is then admitted into the pipes O, and as soon as sufficient heat is given to the mass by the eradiation of the pipes, the mashing-machine is set in motion by means of shaft D. After the mashing-process is effected, the machine is to be stopped, and raised, with the screenings, out of boiler A, by setting shaft H in motion. This being accomplished, the beer is to be boiled by further application of steam, and to be withdrawn from boiler A.

Having thus fully described our invention, and what we desire to secure by Letters Patent, we do not wish to be understood as if we were claiming any particular mode for effecting the beer-mashing and boiling-process in one and the same tub or boiler, as this might be varied without changing the principle of our invention.

What we do claim as our invention, is—

The combining of a beer-mashing and boiling-apparatus, in the manner and for the purpose set forth, or any other principally the same.

JOHN STARK,
MICH. STARK.

Witnesses:
　AUSTIN S. HART,
　H. WM. DOPP.